(12) United States Patent
Zellner

(10) Patent No.: US 7,945,253 B2
(45) Date of Patent: *May 17, 2011

(54) METHOD, SYSTEM, AND STORAGE MEDIUM FOR PROVIDING COMPREHENSIVE ORIGINATOR IDENTIFICATION SERVICES

(75) Inventor: Samuel Zellner, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/560,684

(22) Filed: Sep. 16, 2009

(65) Prior Publication Data

US 2010/0029258 A1 Feb. 4, 2010

Related U.S. Application Data

(63) Continuation of application No. 10/713,939, filed on Nov. 13, 2003, now Pat. No. 7,623,849.

(51) Int. Cl.
*H04M 3/42* (2006.01)

(52) U.S. Cl. .............. 455/415; 379/142.01; 379/142.02; 379/142.04; 379/142.06

(58) Field of Classification Search .................. 455/415; 379/142.01, 142.02, 142.04, 142.06
See application file for complete search history.

(56) References Cited

U.S. PATENT DOCUMENTS

| 4,266,098 | A | 5/1981 | Novak |
| 4,268,722 | A | 5/1981 | Little et al. |
| 4,277,649 | A | 7/1981 | Sheinbein |
| 4,582,956 | A | 4/1986 | Doughty |
| 4,649,433 | A | 3/1987 | Verhoeven |
| 4,649,533 | A | 3/1987 | Chorley et al. |
| 4,663,777 | A | 5/1987 | Szeto |
| 4,674,115 | A | 6/1987 | Kaleita et al. |
| 4,698,839 | A | 10/1987 | DeVaney et al. |
| 4,791,664 | A | 12/1988 | Lutz et al. |
| 4,797,911 | A | 1/1989 | Szlam et al. |
| 4,802,202 | A | 1/1989 | Takahashi et al. |
| 4,817,133 | A | 3/1989 | Takahashi et al. |

(Continued)

FOREIGN PATENT DOCUMENTS

EP 0821511 A2 7/1997

(Continued)

OTHER PUBLICATIONS

U.S. Appl. No. 09/812,338, filed Mar. 19, 2001 Smith.

(Continued)

*Primary Examiner* — Charles Shedrick
(74) *Attorney, Agent, or Firm* — Cantor Colburn LLP

(57) ABSTRACT

A method for transmitting enhanced originator information over a communications network includes retrieving a service profile for a recipient terminal from a service profile database in response to initiation of a communication by an originator terminal to the recipient terminal. The service profile specifies a service plan and a terminal capability of the recipient terminal to retrieve the enhanced originator information from the originator terminal. The method also includes retrieving multiple information elements associated with the originator terminal from a network database based upon the service plan and the terminal capability of the recipient terminal, and transmitting a communication including the multiple information elements to the recipient terminal prior to establishing a communications session with the recipient terminal. The service plans are stored in a dual format that accommodates both graphically-enabled caller identification devices and caller identification devices that are not graphically enabled.

18 Claims, 5 Drawing Sheets

U.S. PATENT DOCUMENTS

| | | |
|---|---|---|
| 4,823,304 A | 4/1989 | Frantz et al. |
| 4,845,743 A | 7/1989 | Lutz |
| 4,850,013 A | 7/1989 | Rose |
| 4,850,103 A | 7/1989 | Takemoto et al. |
| 4,995,075 A | 2/1991 | Angiolillo-Bent et al. |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow et al. |
| D338,889 S | 8/1993 | Fuqua et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,333,186 A | 7/1994 | Gupta |
| 5,338,889 A | 8/1994 | Vora et al. |
| 5,341,411 A * | 8/1994 | Hashimoto ............... 379/88.19 |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | de Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,539,809 A | 7/1996 | Mayer et al. |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi et al. |
| 5,859,903 A | 1/1999 | Lee |
| 5,872,834 A | 2/1999 | Teitelbaum |
| 5,872,934 A | 2/1999 | Whitehouse et al. |
| 5,875,239 A * | 2/1999 | Koralewski et al. ..... 379/142.15 |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,923,744 A | 7/1999 | Cheng |
| 5,930,701 A | 7/1999 | Skog |
| 5,940,484 A | 8/1999 | DeFazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,005,870 A | 12/1999 | Leung et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |
| 6,021,427 A | 2/2000 | Spagna et al. |
| 6,031,899 A | 2/2000 | Wu |
| 6,044,148 A | 3/2000 | Bleile |
| 6,049,291 A | 4/2000 | Kikinis |

| Patent | Kind | Date | Inventor |
|---|---|---|---|
| 6,058,171 | A | 5/2000 | Hoopes |
| 6,061,434 | A | 5/2000 | Corbett |
| 6,061,566 | A | 5/2000 | Friman |
| 6,064,876 | A | 5/2000 | Ishida et al. |
| 6,065,844 | A | 5/2000 | Chen |
| 6,072,859 | A | 6/2000 | Kong |
| 6,078,581 | A | 6/2000 | Shtivelman et al. |
| 6,091,947 | A | 7/2000 | Sumner |
| 6,094,478 | A | 7/2000 | Shepherd et al. |
| 6,094,573 | A | 7/2000 | Heinonen et al. |
| 6,094,574 | A | 7/2000 | Vance et al. |
| 6,094,575 | A | 7/2000 | Anderson et al. |
| 6,101,246 | A | 8/2000 | Heinmiller et al. |
| 6,104,784 | A | 8/2000 | Robbins |
| 6,104,800 | A | 8/2000 | Benson |
| 6,108,630 | A | 8/2000 | Kuechler et al. |
| 6,111,939 | A | 8/2000 | Brabanec |
| 6,134,235 | A | 10/2000 | Goldman et al. |
| 6,134,311 | A | 10/2000 | Ekstrom |
| 6,137,870 | A | 10/2000 | Scherer |
| 6,137,871 | A | 10/2000 | Maier et al. |
| 6,141,341 | A | 10/2000 | Jones et al. |
| 6,141,409 | A | 10/2000 | Madoch et al. |
| 6,144,644 | A | 11/2000 | Bajzath et al. |
| 6,154,531 | A | 11/2000 | Clapper |
| 6,160,876 | A | 12/2000 | Moss et al. |
| 6,161,021 | A | 12/2000 | Akpa |
| 6,163,595 | A | 12/2000 | Parker et al. |
| 6,163,691 | A | 12/2000 | Buettner et al. |
| 6,167,254 | A | 12/2000 | Chavez, Jr. et al. |
| 6,169,911 | B1 | 1/2001 | Wagner et al. |
| 6,173,049 | B1 | 1/2001 | Malik |
| 6,178,232 | B1 | 1/2001 | Latter et al. |
| 6,181,928 | B1 | 1/2001 | Moon |
| D437,879 | S | 2/2001 | Weinandt |
| 6,185,289 | B1 | 2/2001 | Hetz et al. |
| 6,185,426 | B1 | 2/2001 | Alperovich et al. |
| 6,192,115 | B1 | 2/2001 | Toy et al. |
| 6,192,116 | B1 | 2/2001 | Mayak |
| 6,198,480 | B1 | 3/2001 | Cotugno et al. |
| 6,198,920 | B1 | 3/2001 | Doviak et al. |
| 6,202,023 | B1 | 3/2001 | Hancock et al. |
| 6,219,413 | B1 | 4/2001 | Burg |
| 6,222,826 | B1 | 4/2001 | Faynberg et al. |
| 6,226,367 | B1 | 5/2001 | Smith et al. |
| 6,226,369 | B1 | 5/2001 | Lim et al. |
| 6,226,399 | B1 | 5/2001 | Robinson |
| 6,230,006 | B1 | 5/2001 | Keenan et al. |
| 6,233,325 | B1 | 5/2001 | Frech et al. |
| 6,236,975 | B1 | 5/2001 | Boe et al. |
| 6,243,448 | B1 | 6/2001 | Corbett et al. |
| 6,243,461 | B1 | 6/2001 | Hwang |
| 6,246,976 | B1 | 6/2001 | Mukaigawa et al. |
| 6,252,952 | B1 | 6/2001 | Kung et al. |
| 6,256,671 | B1 | 7/2001 | Strentzsch et al. |
| 6,262,987 | B1 | 7/2001 | Mogul |
| 6,266,399 | B1 | 7/2001 | Weller et al. |
| 6,278,704 | B1 | 8/2001 | Creamer et al. |
| 6,278,862 | B1 | 8/2001 | Henderson |
| 6,282,275 | B1 | 8/2001 | Gurbani et al. |
| 6,292,479 | B1 | 9/2001 | Bartholomew et al. |
| 6,292,549 | B1 | 9/2001 | Lung et al. |
| 6,295,502 | B1 | 9/2001 | Hancock et al. |
| 6,301,342 | B1 | 10/2001 | Ander et al. |
| 6,301,350 | B1 | 10/2001 | Henningson et al. |
| 6,304,644 | B2 | 10/2001 | Karnowski |
| 6,310,943 | B1 | 10/2001 | Kowalski |
| 6,311,057 | B1 | 10/2001 | Barvesten |
| 6,317,488 | B1 | 11/2001 | DePond et al. |
| 6,317,781 | B1 | 11/2001 | De Boor et al. |
| 6,324,263 | B1 | 11/2001 | Sherwood et al. |
| 6,324,271 | B1 | 11/2001 | Sawyer et al. |
| 6,327,347 | B1 | 12/2001 | Gutzmann |
| 6,332,021 | B2 | 12/2001 | Latter et al. |
| 6,333,973 | B1 | 12/2001 | Smith et al. |
| 6,337,904 | B1 | 1/2002 | Gisby |
| 6,337,979 | B1 | 1/2002 | Nakayasu |
| 6,339,639 | B1 | 1/2002 | Henderson |
| 6,341,161 | B1 | 1/2002 | Latter et al. |
| 6,345,187 | B1 | 2/2002 | Berthoud et al. |
| 6,347,136 | B1 | 2/2002 | Horan |
| 6,351,637 | B1 | 2/2002 | Lee |
| 6,353,664 | B1 | 3/2002 | Cannon et al. |
| 6,361,637 | B2 | 3/2002 | Martin et al. |
| 6,363,140 | B1 | 3/2002 | Pinard |
| 6,363,411 | B1 | 3/2002 | Dugan et al. |
| 6,363,664 | B1 | 4/2002 | Brutsaert |
| 6,366,661 | B1 | 4/2002 | Devillier et al. |
| 6,366,772 | B1 | 4/2002 | Arnson |
| 6,377,807 | B1 | 4/2002 | Iparrea et al. |
| 6,377,979 | B1 | 4/2002 | Yamashita et al. |
| 6,389,124 | B1 | 5/2002 | Schnarel et al. |
| 6,400,809 | B1 | 6/2002 | Bossemeyer, Jr. et al. |
| 6,400,947 | B1 | 6/2002 | Bright et al. |
| 6,404,868 | B1 | 6/2002 | Beamish et al. |
| 6,404,875 | B2 | 6/2002 | Malik et al. |
| 6,411,692 | B1 | 6/2002 | Scherer |
| 6,421,425 | B1 | 7/2002 | Bossi et al. |
| 6,422,263 | B1 | 7/2002 | Spicer |
| 6,427,003 | B1 | 7/2002 | Corbett et al. |
| 6,427,064 | B1 | 7/2002 | Henderson |
| 6,434,394 | B1 | 8/2002 | Grundvig et al. |
| 6,437,879 | B1 | 8/2002 | Temple |
| 6,438,216 | B1 | 8/2002 | Aktas |
| 6,438,217 | B1 | 8/2002 | Huna |
| 6,438,584 | B1 | 8/2002 | Powers |
| 6,442,249 | B1 | 8/2002 | Miller, Jr. |
| 6,442,262 | B1 | 8/2002 | Moss et al. |
| 6,442,263 | B1 | 8/2002 | Beaton et al. |
| 6,442,283 | B1 | 8/2002 | Tewfik et al. |
| 6,445,781 | B1 | 9/2002 | Heinmiller et al. |
| 6,449,351 | B1 | 9/2002 | Moss et al. |
| 6,449,361 | B1 | 9/2002 | Okuda |
| 6,462,646 | B2 | 10/2002 | Helferich |
| 6,466,653 | B1 | 10/2002 | Hamrick et al. |
| 6,477,246 | B1 | 11/2002 | Dolan et al. |
| 6,480,589 | B1 | 11/2002 | Lee et al. |
| 6,483,898 | B2 | 11/2002 | Lew et al. |
| 6,493,430 | B2 | 12/2002 | Leuca et al. |
| 6,493,431 | B1 | 12/2002 | Troen-Krasnow et al. |
| 6,493,437 | B1 | 12/2002 | Olshansky |
| 6,493,439 | B2 | 12/2002 | Lung et al. |
| 6,494,953 | B2 | 12/2002 | Hayes et al. |
| 6,496,569 | B2 | 12/2002 | Pelletier et al. |
| 6,496,571 | B1 | 12/2002 | Wilson |
| 6,496,692 | B1 | 12/2002 | Shanahan |
| 6,498,841 | B2 | 12/2002 | Bull et al. |
| 6,507,737 | B1 | 1/2003 | Laham et al. |
| 6,529,500 | B1 | 3/2003 | Pandharipande |
| 6,529,591 | B1 | 3/2003 | Dosani et al. |
| 6,532,490 | B1 | 3/2003 | Lewis et al. |
| 6,539,080 | B1 | 3/2003 | Bruce et al. |
| 6,542,583 | B1 | 4/2003 | Taylor |
| 6,542,586 | B1 | 4/2003 | Helstab |
| 6,542,591 | B1 | 4/2003 | Amro et al. |
| 6,542,602 | B1 | 4/2003 | Elazar |
| 6,542,812 | B1 | 4/2003 | Obradovich et al. |
| 6,546,092 | B2 | 4/2003 | Corbett et al. |
| 6,549,621 | B1 | 4/2003 | Christie, IV et al. |
| 6,553,110 | B1 | 4/2003 | Peng |
| 6,553,221 | B1 | 4/2003 | Nakamura et al. |
| 6,556,540 | B1 | 4/2003 | Mawhinney et al. |
| 6,560,317 | B1 | 5/2003 | Quagliana |
| 6,560,327 | B1 | 5/2003 | McConnell |
| 6,566,995 | B2 | 5/2003 | Furuuchi et al. |
| 6,570,971 | B1 | 5/2003 | Latter et al. |
| 6,570,974 | B1 | 5/2003 | Gerszberg et al. |
| 6,574,319 | B2 | 6/2003 | Latter et al. |
| 6,580,904 | B2 | 6/2003 | Cox et al. |
| 6,584,490 | B1 | 6/2003 | Schuster et al. |
| 6,587,458 | B1 | 7/2003 | Burg et al. |
| 6,590,970 | B1 | 7/2003 | Cai et al. |
| 6,597,905 | B1 | 7/2003 | Hijii |
| 6,603,840 | B2 | 8/2003 | Fellingham et al. |
| 6,603,854 | B1 | 8/2003 | Judkins et al. |
| 6,608,891 | B1 | 8/2003 | Pelletier et al. |
| 6,618,474 | B1 | 9/2003 | Reese |
| 6,625,595 | B1 | 9/2003 | Anderson et al. |

| | | | | | | |
|---|---|---|---|---|---|---|
| 6,631,181 B1 | 10/2003 | Bates et al. | | 6,898,275 B2 | 5/2005 | Dolan et al. |
| 6,633,633 B1 | 10/2003 | Bedingfield | | 6,904,137 B2 | 6/2005 | Brandt et al. |
| 6,639,979 B1 | 10/2003 | Kim | | 6,904,276 B1 | 6/2005 | Freeman et al. |
| 6,650,743 B2 | 11/2003 | Heinmiller et al. | | 6,907,034 B1 | 6/2005 | Begis |
| 6,659,597 B2 | 12/2003 | Murata et al. | | 6,909,777 B2 | 6/2005 | Latter et al. |
| 6,661,785 B1 | 12/2003 | Zhang et al. | | 6,914,953 B2 | 7/2005 | Boerstler |
| 6,665,378 B1 | 12/2003 | Spielman et al. | | 6,922,411 B1 | 7/2005 | Taylor |
| 6,665,388 B2 | 12/2003 | Bedingfield | | 6,928,154 B1 | 8/2005 | Cheaito et al. |
| 6,665,715 B1 | 12/2003 | Houri | | 6,931,007 B2 | 8/2005 | Jones |
| 6,675,008 B1 * | 1/2004 | Paik et al. ............... 455/415 | | 6,947,531 B1 | 9/2005 | Lewis et al. |
| 6,683,870 B1 | 1/2004 | Archer | | 6,952,469 B2 | 10/2005 | Han |
| 6,687,341 B1 | 2/2004 | Koch et al. | | 6,970,546 B2 | 11/2005 | Kent, Jr. et al. |
| 6,697,357 B2 | 2/2004 | Emerson, III | | 6,977,993 B2 | 12/2005 | Starbuck et al. |
| 6,701,160 B1 | 3/2004 | Pinder et al. | | 6,996,211 B2 | 2/2006 | Reynolds et al. |
| 6,714,519 B2 | 3/2004 | Luzzatti et al. | | 7,012,999 B2 | 3/2006 | Ruckart |
| 6,718,021 B2 | 4/2004 | Crockett et al. | | 7,016,482 B2 | 3/2006 | Moss et al. |
| 6,721,407 B1 | 4/2004 | Michelena | | 7,020,250 B2 | 3/2006 | Lew et al. |
| 6,724,872 B1 | 4/2004 | Moore et al. | | 7,027,408 B2 | 4/2006 | Nabkel et al. |
| 6,725,872 B2 | 4/2004 | Kindell et al. | | 7,027,569 B2 | 4/2006 | Price |
| 6,728,355 B2 | 4/2004 | Kowalski | | 7,076,051 B2 | 7/2006 | Brown et al. |
| 6,728,360 B1 | 4/2004 | Brennan | | 7,079,837 B1 | 7/2006 | Sherman et al. |
| 6,728,365 B1 | 4/2004 | Li et al. | | 7,085,257 B1 | 8/2006 | Karves et al. |
| 6,731,727 B2 | 5/2004 | Corbett et al. | | 7,085,358 B2 | 8/2006 | Ruckart |
| 6,732,188 B1 | 5/2004 | Flockhart et al. | | 7,085,578 B2 | 8/2006 | Barclay et al. |
| 6,738,615 B1 | 5/2004 | Chow et al. | | 7,095,715 B2 | 8/2006 | Buckman et al. |
| 6,748,058 B1 | 6/2004 | Schwend et al. | | 7,097,169 B2 | 8/2006 | Mueller |
| 6,748,068 B1 | 6/2004 | Walsh et al. | | 7,103,167 B2 | 9/2006 | Brahm et al. |
| 6,751,457 B1 | 6/2004 | Martin | | 7,103,662 B2 | 9/2006 | Ray et al. |
| 6,757,274 B1 | 6/2004 | Bedingfield et al. | | 7,107,077 B2 | 9/2006 | Lee |
| 6,757,530 B2 | 6/2004 | Rouse et al. | | 7,113,577 B2 | 9/2006 | Cook et al. |
| 6,757,732 B1 | 6/2004 | Sollee et al. | | 7,127,488 B1 | 10/2006 | Scott et al. |
| 6,757,740 B1 | 6/2004 | Parekh et al. | | 7,139,374 B1 | 11/2006 | Scott et al. |
| 6,760,413 B2 | 7/2004 | Cannon et al. | | 7,152,118 B2 | 12/2006 | Anderson, IV et al. |
| 6,765,998 B2 | 7/2004 | Bruce et al. | | 7,155,211 B2 | 12/2006 | Mun et al. |
| 6,766,003 B2 | 7/2004 | Moss et al. | | 7,184,533 B1 | 2/2007 | Shaffer et al. |
| 6,768,792 B2 | 7/2004 | Brown et al. | | 7,215,750 B2 | 5/2007 | Nguyen et al. |
| D494,953 S | 8/2004 | Leung | | 7,228,129 B1 | 6/2007 | Ward et al. |
| 6,771,754 B2 | 8/2004 | Pelletier et al. | | 7,254,226 B1 | 8/2007 | Roberts et al. |
| 6,771,755 B1 | 8/2004 | Simpson | | 7,257,210 B1 * | 8/2007 | Henderson ............... 379/142.04 |
| 6,771,956 B1 | 8/2004 | Beeler | | 7,313,227 B2 | 12/2007 | Jones |
| 6,775,366 B1 | 8/2004 | Cobbett et al. | | 7,315,614 B2 | 1/2008 | Bedingfield, Sr. et al. |
| 6,775,371 B2 | 8/2004 | Elsey et al. | | 7,386,319 B2 | 6/2008 | Rogalski et al. |
| 6,775,540 B2 | 8/2004 | Iyer | | 7,403,768 B2 | 7/2008 | Bedingfield, Sr. et al. |
| 6,778,524 B1 | 8/2004 | Augart | | 7,418,096 B2 | 8/2008 | Moton et al. |
| 6,779,020 B1 | 8/2004 | Henrick | | 7,443,964 B2 | 10/2008 | Urban et al. |
| 6,785,301 B1 | 8/2004 | Chapman et al. | | 7,613,810 B2 | 11/2009 | Romero et al. |
| 6,785,368 B1 | 8/2004 | Eason et al. | | 7,623,645 B1 | 11/2009 | Scott et al. |
| 6,785,540 B1 | 8/2004 | Wichelman | | 7,631,047 B1 | 12/2009 | Adamczyk et al. |
| 6,792,266 B1 | 9/2004 | Masuda et al. | | 7,672,444 B2 | 3/2010 | Perrella et al. |
| 6,798,841 B2 | 9/2004 | Hansen | | 2001/0005854 A1 | 6/2001 | Murata et al. |
| 6,798,876 B1 | 9/2004 | Bala | | 2001/0036174 A1 | 11/2001 | Herring |
| 6,798,879 B1 | 9/2004 | Beham | | 2001/0044898 A1 | 11/2001 | Benussi et al. |
| 6,804,503 B2 | 10/2004 | Shohara et al. | | 2001/0048737 A1 | 12/2001 | Goldberg et al. |
| 6,807,267 B2 | 10/2004 | Moss et al. | | 2002/0007400 A1 | 1/2002 | Pedersen |
| 6,810,077 B1 | 10/2004 | Dezonno | | 2002/0009184 A1 | 1/2002 | Shnier |
| 6,810,115 B2 | 10/2004 | Fukuda | | 2002/0016748 A1 | 2/2002 | Emodi et al. |
| 6,813,344 B1 | 11/2004 | Lemke | | 2002/0041605 A1 | 4/2002 | Benussi et al. |
| 6,816,481 B1 | 11/2004 | Adams et al. | | 2002/0055926 A1 | 5/2002 | Dan et al. |
| 6,818,474 B2 | 11/2004 | Kim et al. | | 2002/0067816 A1 | 6/2002 | Bushnell |
| 6,826,270 B1 | 11/2004 | Welch et al. | | 2002/0077102 A1 | 6/2002 | Achuthan et al. |
| 6,826,271 B1 | 11/2004 | Kanabar et al. | | 2002/0082050 A1 | 6/2002 | Mountney et al. |
| 6,826,617 B1 | 11/2004 | Ansell et al. | | 2002/0085687 A1 | 7/2002 | Contractor et al. |
| 6,830,595 B2 | 12/2004 | Reynolds, III | | 2002/0091777 A1 | 7/2002 | Schwartz |
| 6,831,974 B1 | 12/2004 | Watson et al. | | 2002/0118812 A1 | 8/2002 | Contractor |
| 6,842,512 B2 | 1/2005 | Pedersen | | 2002/0119430 A1 | 8/2002 | Szynalski |
| 6,845,151 B2 | 1/2005 | Peng | | 2002/0120629 A1 | 8/2002 | Leonard |
| 6,845,512 B2 | 1/2005 | Horng et al. | | 2002/0122401 A1 | 9/2002 | Xiang et al. |
| 6,853,710 B2 | 2/2005 | Harris | | 2002/0125929 A1 | 9/2002 | Chen et al. |
| 6,853,711 B2 | 2/2005 | Brisebois et al. | | 2002/0128033 A1 | 9/2002 | Burgess |
| 6,856,677 B2 | 2/2005 | Leijonhufvud | | 2002/0171581 A1 | 11/2002 | Sheynblat et al. |
| 6,859,827 B2 | 2/2005 | Banginwar | | 2002/0172338 A1 | 11/2002 | Lee et al. |
| 6,865,266 B2 | 3/2005 | Pershan | | 2002/0183098 A1 | 12/2002 | Lee et al. |
| 6,865,384 B2 | 3/2005 | Sagi et al. | | 2002/0188443 A1 | 12/2002 | Reddy et al. |
| 6,868,155 B1 | 3/2005 | Cannon et al. | | 2002/0197991 A1 | 12/2002 | Anvekar et al. |
| 6,870,924 B1 | 3/2005 | Ukon | | 2003/0002633 A1 | 1/2003 | Kredo et al. |
| 6,871,076 B2 | 3/2005 | Samn | | 2003/0006912 A1 | 1/2003 | Brescia |
| 6,888,927 B1 | 5/2005 | Cruickshank et al. | | 2003/0012353 A1 | 1/2003 | Tang et al. |
| 6,888,972 B2 | 5/2005 | Berg et al. | | 2003/0016143 A1 | 1/2003 | Ghazarian |
| 6,891,940 B1 | 5/2005 | Bhandari et al. | | 2003/0021290 A1 | 1/2003 | Jones |

| | | |
|---|---|---|
| 2003/0026416 A1 | 2/2003 | Fusco |
| 2003/0032414 A1 | 2/2003 | Melaku et al. |
| 2003/0043974 A1 | 3/2003 | Emerson, III |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0065776 A1 | 4/2003 | Malik et al. |
| 2003/0068020 A1 | 4/2003 | Hamrick et al. |
| 2003/0092384 A1 | 5/2003 | Ross, III |
| 2003/0092432 A1 | 5/2003 | Hwang |
| 2003/0095650 A1 | 5/2003 | Mize |
| 2003/0096581 A1 | 5/2003 | Takamine |
| 2003/0112938 A1 | 6/2003 | Kanakubo et al. |
| 2003/0119522 A1 | 6/2003 | Barclay et al. |
| 2003/0133543 A1 | 7/2003 | Khakoo et al. |
| 2003/0133553 A1 | 7/2003 | Khakoo et al. |
| 2003/0133653 A1 | 7/2003 | Barros et al. |
| 2003/0135562 A1 | 7/2003 | Himmel et al. |
| 2003/0148758 A1 | 8/2003 | McMullin |
| 2003/0152207 A1 | 8/2003 | Ryan |
| 2003/0187949 A1 | 10/2003 | Bhatt et al. |
| 2003/0193967 A1 | 10/2003 | Fenton et al. |
| 2003/0196206 A1 | 10/2003 | Shusman |
| 2003/0198322 A1 | 10/2003 | White, Jr. |
| 2003/0215070 A1 | 11/2003 | Akhteruzzaman et al. |
| 2003/0219107 A1 | 11/2003 | Richardson et al. |
| 2004/0049545 A1 | 3/2004 | Wayne Lockridge et al. |
| 2004/0101118 A1 | 5/2004 | Powell |
| 2004/0101124 A1 | 5/2004 | Koch et al. |
| 2004/0109558 A1 | 6/2004 | Koch |
| 2004/0114603 A1 | 6/2004 | Suhail et al. |
| 2004/0114730 A1 | 6/2004 | Koch et al. |
| 2004/0120475 A1 | 6/2004 | Bauer et al. |
| 2004/0125929 A1 | 7/2004 | Pope |
| 2004/0171370 A1 | 9/2004 | Natarajan |
| 2004/0181587 A1 | 9/2004 | Cao et al. |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. |
| 2004/0209640 A1 | 10/2004 | Urban et al. |
| 2004/0233892 A1 | 11/2004 | Roberts et al. |
| 2004/0242212 A1 | 12/2004 | Bacon et al. |
| 2004/0248560 A1 | 12/2004 | Bedingfield, Sr. et al. |
| 2005/0068166 A1 | 3/2005 | Baker |
| 2005/0073999 A1 | 4/2005 | Koch |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2005/0157861 A1 | 7/2005 | Bossemeyer et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0152207 A1 | 7/2006 | Riebel et al. |
| 2006/0153173 A1 | 7/2006 | Beck et al. |
| 2007/0064911 A1 | 3/2007 | Bedingfield, Sr. et al. |

FOREIGN PATENT DOCUMENTS

| | | |
|---|---|---|
| KR | 2002014945 A | 2/2002 |
| WO | 97/50225 A2 | 12/1997 |
| WO | 03/030501 A1 | 4/2003 |
| WO | 03/030502 A1 | 4/2003 |
| WO | 03090432 A1 | 10/2003 |

OTHER PUBLICATIONS

U.S. Appl. No. 10/144,555, filed May 13, 2002 Koch et al.
U.S. Appl. No. 10/152,544, filed May 21, 2002 Alston et al.
U.S. Appl. No. 10/200,874, filed Jul. 23, 2002 Scott et al.
U.S. Appl. No. 10/200,906, filed Jul. 23, 2002 Scott et al.
Aastra Telecom, Press Release, "Aastra Telecom Introduces CNX Conference Bridge", Aug. 29, 2005, 1 page.
Bellcore Specification TR-NWT-000031, Calling Number Delivery, Issue 4, Dec. 1992.
Bellcore Specification TR-NWT-001188, Calling Name Delivery Generic Requirements, Issue 1, Dec. 1991.
Aastra Telecom [online]; [retrieved on Aug. 31, 2001]; retrieved from the Internet http://www.aastra.com/products/callerids/voicecallerid/be-6060.html "Voice-6090 Taling Caller ID" 1p.
Egevang et al., "The IP Network Address Translator (NAT)", May 1994, 8 ppgs.
Aastra Telecom, [online]; [retrieved on Nov. 5, 2001]; http://www.aastra.com/products/callerids/voicecallerid/be-9090.html "Voice-9090 'Talking Caller ID'" 1p.
Handley et al., "SIP: Session Initiation Protocol", Mar. 1999, 112 ppgs.
International Search Report; International Application No. PCT/US02/29988; International Filing Date: Sep. 23, 2002; Date of Mailing: Nov. 27, 2002; 1 page.
International Search Report; International Application No. PCT/US02/30068; International Filing Date: Sep. 24, 2002; Date of Mailing: Dec. 9, 2002; 1 page.
J. Boswell et al., "An Advanced HF Receiver Design", Jul. 1994, IEE, Conference Publication. No. 392, pp. 41-47*.
Aastra Technologies, [online]; [retrieved on Aug. 31, 2001]; retrieved from the Internet http://www.aastra.com/products/callerids/voicecallerid/be-6060.html "Venture IP Telephone System" 1ppgs.
M. Norris, "Transmitter Architectures", 1998,, pp. 4/1-4/6, IEE, London, UK.
Testmark [online]; [retrieved on Oct. 31, 2001]; retrieved from the Internet http://www.testmark.com/develop/tml_callerid_cnt.html
M. Slawson, "Caller ID Basics", 10 ppgs.
OKI Silicon Solutions Company, Japan Site, [online]; [retrieved on Aug. 31, 2005] retrieved from the Internet http:// www.//oki.com/semi/English/m12110/htm "Multi-Lingual Text-to-Speech Processor ML2110" 5 pages.
"RBS 884 Pico System Description", Author Unknown, Ericsson 1/1551-AE/LZB 119 2269 Uae Rev A, Apr. 23, 1998, p. 2-3 to 2-28.
Rekhter et al. "Address Allocation for Private Internets", pp. 1-8, Feb. 1996.
SmartHome, [online]; [retrieved on Aug. 31, 2005]; retrieved from the Internet http://www.smarthome.com/5154.html "The Caller ID System that Speaks for Itself!", 2 pgs.
SmartHome; [online]; [retrieved on Nov. 5, 2001]; retrieved from the Internet http://www.smarthome.com/5154.html "The Caller ID System that Speaks of Itself! Talking Caller ID", 3 ppgs.
TelecomWriting [online]; [retrieved on Mar. 6, 2003]; retrieved from the Internet http://www.privateline.com/Cellbasics/Cellbasics.html T.Farley et al.; "Cellular Telephone Basics: AMPS & Beyond", 8 pages.
Talking Caller ID; [online]; [retrieved on Nov. 5, 2001]; retrieved from the Internet http://www.talkingcallerid.com/ "Talking Caller ID by Stealth Software" 4 ppgs.
International Engineering Consortium, [online]; [retrieved on Mar. 6, 2003]; retrieved from the Internet http://www.iec.org/online/tutorials/tdma/ "Time Division Multiple Access (TDMA)" 2003, 2 ppgs, IEC.

* cited by examiner

METHOD, SYSTEM, AND STORAGE MEDIUM FOR PROVIDING COMPREHENSIVE ORIGINATOR IDENTIFICATION SERVICES

CROSS-REFERENCE TO RELATED APPLICATIONS

This non-provisional U.S. Patent Application is a continuation of pending U.S. patent application Ser. No. 10/713,939, filed Nov. 13, 2003, and assigned to the present assignee, the contents of which are incorporated herein in its entirety.

BACKGROUND OF THE INVENTION

Embodiments of the invention relate generally to telecommunications, and more particularly, to a method, system, and storage medium for providing comprehensive originator identification services over a communications network.

The development of caller identification services has had a significant impact on the ability for called parties to more effectively manage their communications. In emergency situations, existing caller identification services provide a way for an emergency center to identify the location and the identity of the calling party and for calling the party back should the two parties become disconnected. Many consumers use caller identification to screen incoming calls from parties they do not wish to talk to. Conversely, call blocking services allow callers to keep their identities and/or telephone numbers private in cases where they do not wish the receiving party to have this information. Other forms of communication, such as email, provide some level of identification information regarding the originator before the recipient opens the message (e.g., originator, subject matter). These solutions, while beneficial, do not take full advantage of what is now possible with existing technology.

What is needed, therefore, is a way to extend existing capabilities and functionality for caller identification services by providing detailed information about an incoming communication before the communication session has been established.

SUMMARY OF THE INVENTION

Embodiments relate to a method, system, and storage medium for transmitting enhanced originator information over a communications network. A method includes retrieving service profile for a recipient terminal from a service profile database in response to initiation of a communication by an originator terminal to the recipient terminal. The service profile specifies a service plan and a terminal capability of the recipient terminal to retrieve the enhanced originator information from the originator terminal. The method also includes retrieving multiple information elements associated with the originator terminal from a network database based upon the service plan and the terminal capability of the recipient terminal, and transmitting a communication including the multiple information elements to the recipient terminal prior to establishing a communications session with the recipient terminal. The service plans are stored in a dual format that accommodates both graphically-enabled caller identification devices and caller identification devices that are not graphically enabled.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION OF THE INVENTION

The originator identification system of the invention is a flexible and comprehensive communications identification service that provides a variety of information about a communication to its recipient prior to the recipient establishing a communications session. The originator identification system is capable of being implemented over varying communications networks and for a variety of types of communications devices and technologies. The originator identification system of the invention refers to a system that provides comprehensive information about a calling party to a recipient party via any communications means and is not to be confused with caller identification devices/services commonly known in the art which provide limited caller information such as a phone number or name or systems that use this information to retrieve additional information from locally or centralized databases associated with the individual's address book or a company's customer list.

Figure 1:
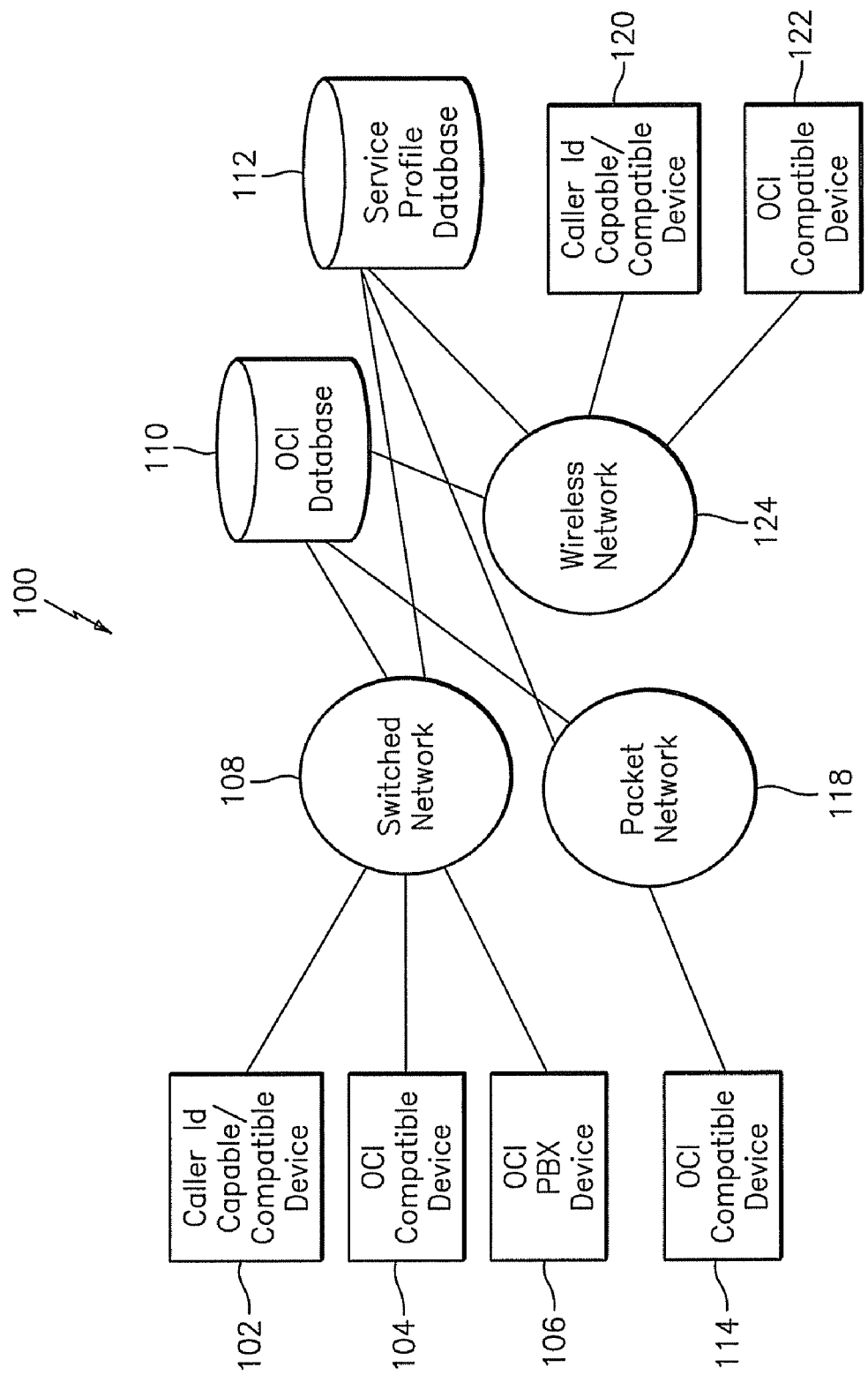
FIG. 1 is a block diagram of a system upon which the originator identification system is implemented in exemplary embodiments of the invention.

The originator identification system is executed via one or more communications networks as shown in system 100 of FIG. 1. FIG. 1 depicts communications devices 102-106 in communication with circuit-switched network 108. Circuit-switched network 108 represents a standard public switched telephone network (PSTN).

Also included in system 100 is communications device 114 in communication with packet-switched network 118. Packet-switched network 118 may be local area network, wide area network, metropolitan area network, Internet network, or other similar type of network environment.

Additionally, communications devices 120 and 122 are in communication with wireless network 124. Wireless network 124 may be a cellular communications network, a fixed wireless network, a wireless local area network, a personal area network (PAN) or other suitable network system and includes equipment for receiving and transmitting signals such as a cell tower and mobile switching center.

Networks 108, 118, and 124 are, in turn, in communication with Originator Communications Information (OCI) database 110 and service profile database 112.

OCI database 110 stores information elements for use in creating, transmitting, and displaying communications information in a caller identification environment. Information elements may include font and character style capabilities such as Times New Roman font set at 12 characters per inch (cpi) that is presentable in bold, italic, and/or underlined form. Information elements may also include logos, images, audio, multi-media, animation, VPIM, uniform resource locators, physical location addresses, video, alerting tones, and advertising material. These information elements may be created and provided by an originating calling device and/or a calling network such as network 108, 118, and 124. OCI information is provided to a recipient prior to the opening or establishment of a communications session.

Service profile database 112 stores information relating to the communications devices and service plans associated with users of the originator identification system. The capabilities and limitations of the communications device are stored in service profile database 112. Further, various packages and options may be established for users such as a standard plan that provides a subset of the possible features of the invention or a premium package that is more inclusive.

OCI database 110 communicates with service profile database 112 for determining what information elements may be accommodated for a communications device. OCI database 110 provides a dual-structured data store for servicing both traditional caller identification enabled devices such as device 102, as well as newer or next generation communications devices such as device 104, which provides advanced capabilities. For example, where a telephone is graphically enabled (e.g., VoIP or cellular), the caller identification element may be leveraged to incorporate a compression algorithm enabling it to hold the additional information elements provided by the OCI database 110. The service profile database 112 would indicate the functionality of the enhanced telephone and the appropriate record data would be accessed from OCI database 110. Another example is a traditional caller identification feature enabled on a telephone with a simple monochrome display that does not support graphics (i.e., only ASCII). The service profile database 112 record for this device would communicate this capability to OCI database 110 which, in turn, would send only the traditional simple binary caller identification information. In this manner, the database provides both standard and the OCI information elements.

Communications device 102 refers to a caller identification-enabled telephone that utilizes a Public Switched Telephone Network (PSTN) carrying analog voice data. Communications device 102 supports traditional caller identification capabilities in accordance with Signaling System 7 (SS7) technology and the Automatic Number Identification (ANI) method used to identify billing accounts. SS7 refers to a telecommunications protocol developed by the International Telecommunications Union (ITU) and is well known in the art.

Communications device 104 refers to a communications device that supports the originator identification system services of the invention. Communications device 104 is enabled to receive traditional caller identification services along with enhanced features, such as graphics. For example, communications device 104 may be a next generation telephone device with processor, memory, screen and logic to display text and graphic including images on display of the user device.

Communications device 106 refers to a telephone that is part of a private communications network (i.e., private branch exchange (PBX), softswitch) for an enterprise. A telephone user shares one or more phone numbers with other telephones within the exchange. Communications device 106 supports the features of the originator identification system, as described above with respect to device 104, through the PBX network.

Communications device 114 refers to a device that communicates through a packet-switched network. For example, communications device 114 may be a personal computer that executes email software and subscribes to an email service. Additionally, the personal computer includes an operating system with a graphics component and a display device for presenting communications. In alternative embodiments, communications device 114 may be an Internet-enabled appliance, such as a television or microwave oven that supports the features of the originator identification system. In the personal computer example above, the communication identification system of the invention services communications device 114 by providing comprehensive information about an incoming email to a recipient via email software executing therein.

Communications device 120 refers to a caller identification-enabled communications device that sends communications over a wireless network. Communications device 120 may be a wireless mobile telephone that communicates via a cell tower and mobile switching center, which, in turn, communicates to other networks via a central office.

Communications device 122 refers to a caller identification-enabled communications device that includes graphics capabilities that support the features of the originator identification system of the invention. Communications device 122 may be a mobile computing device or personal digital assistant (PDA) with networking capability such as a web browser and an Internet Service Provider subscription for allowing the PDA to communicate digitally with other communications devices.

The telecommunications infrastructure required for enabling communications devices 102-106, 114, 120 and 122 are well known and will be understood by those skilled in the art. The originator identification system may provide options to users of communications devices such as the ability to block some information elements and screening and transmission control of information elements. For example, a user may block or screen information elements such as pornographic materials, all video materials, or other criteria-based measures. A recipient may prevent any calls in which a caller has blocked information elements or may forward any calls containing video elements to a cell phone. Alternative embodiments include sending only text caller information (for text only devices), sending information using traditional text caller information with supplemental enhanced originator information using transparent signaling. Other embodiments include utilizing XHTML protocol to communicate OCI data to a receiving terminal. Where transmission bandwidth is limited the OCI data is compressed before transmission. The transport layer protocol may include SMDF, ADSI, TCP/IP, and WAP protocols (i.e., WSP, WTP, WDP, and WCMP). These and other services may be implemented using the originator identification system.

The functionality of the originator identification system may also be extended to telephony applications such as call receipt, call waiting, and call forwarding. It may also be extended to applications such as email, unified messaging, facsimile, video conferencing, audio conferencing, call center applications utilizing caller information to retrieve information or update databases, sending originator information through a communications channel not associated with the recipient of the message content (e.g., originator identification through instant messaging or a web browser), and sharing OCI information between devices, among others.

The originator identification system is implemented over one or more of networks 108, 118, and 124 as described in FIGS. 2-5. The originator identification system can be implemented in a variety of communications environments including, for example, a data network such as the Internet, a voice communications network, and may include various types of networks including wireless, asynchronous transfer mode (ATM) network, and Multiprotocol Label Switching (MPLS).

Figure 2:
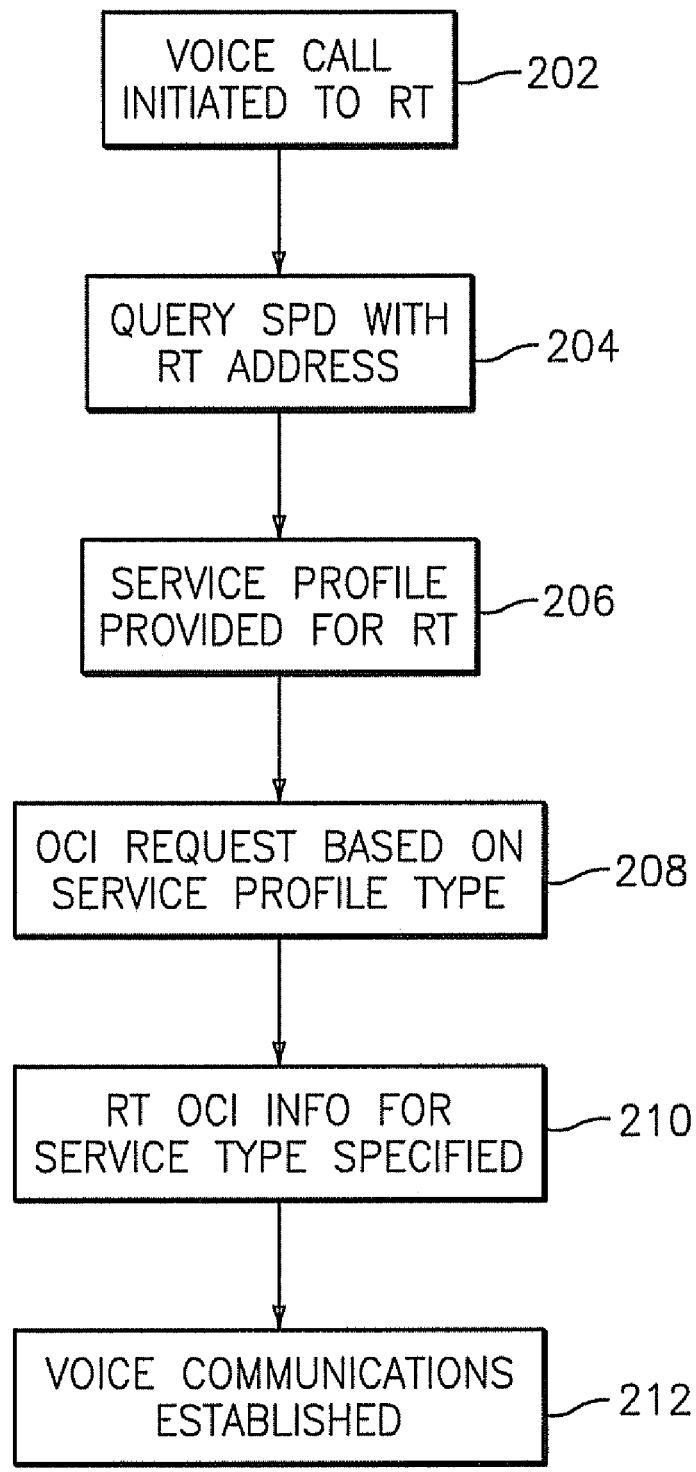
FIG. 2 is a flowchart describing the process of implementing the originator identification system over a circuit switched communications network in exemplary embodiments of the invention.
Figure 3:
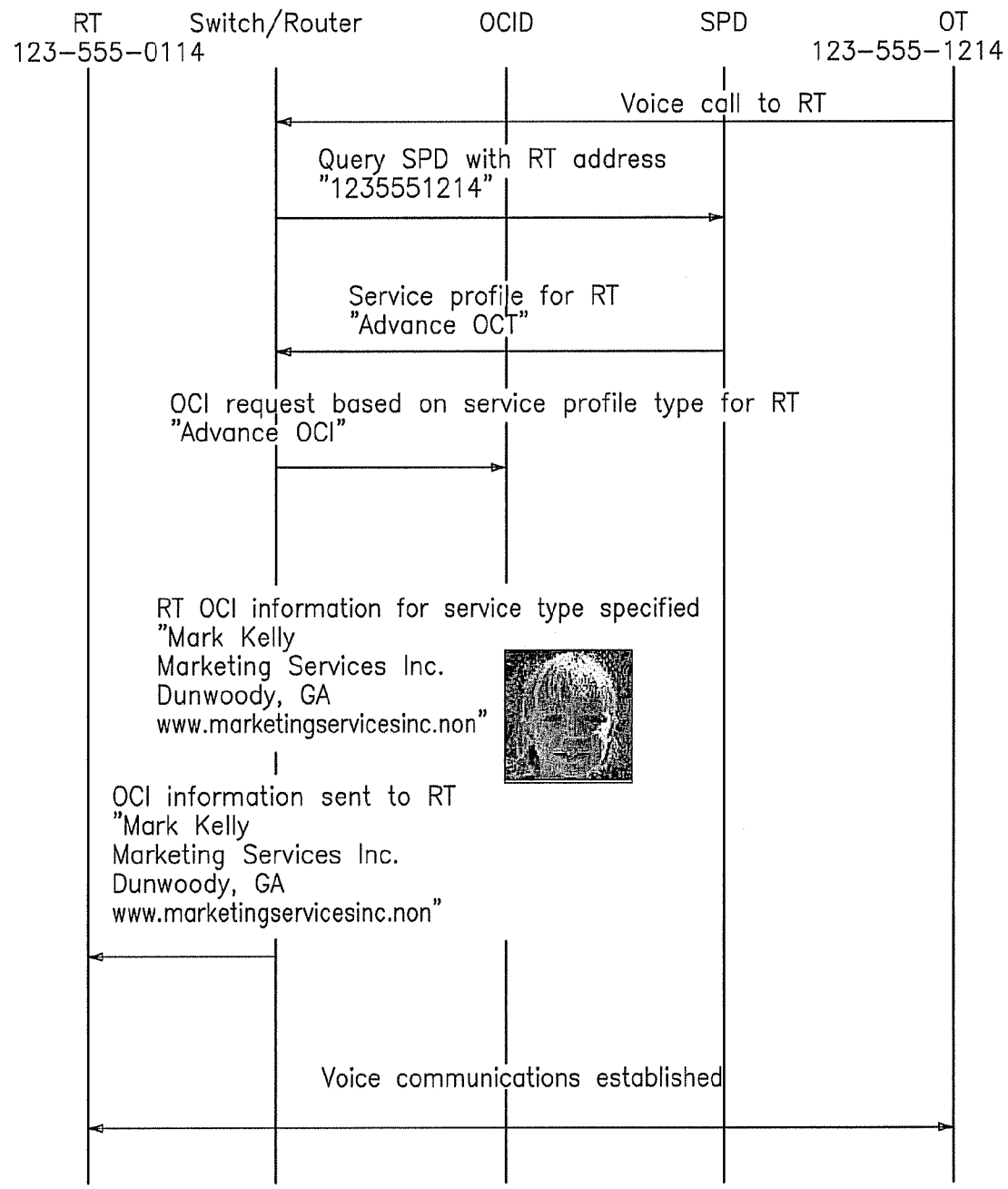
FIG. 3 is a graphical representation of the originator identification system process described in FIG. 2 in exemplary embodiments of the invention.

Turning now to FIG. 2, implementation of the originator identification system over a PSTN network will now be described. A voice call is initiated at step 202 in which an originating terminal places a call to a recipient terminal. The graph in FIG. 3 provides sample data that may be associated with the call. For example, FIG. 3 displays a phone number, 123-555-1214, associated with an originating terminal (OT) number and an arrow indicating the transmission of the call to a switch or router on the network. The originator identification system executing on the network queries service profile database 112 at step 204 to determine the service type and/or device type that is associated with the recipient terminal. For example, the originator identification system needs to know what technological and/or service type capabilities are associated with the recipient terminal. It may be that the recipient terminal does not support caller identification or that the recipient terminal supports caller identification but only in the traditional ASCII format. It may also be that the respective network provides service plan options or packages that a recipient terminal user needs to subscribe to in order to benefit from the services offered by the originator identification system. These and other types of information may be provided in service profile database 112.

The respective service profile for the recipient terminal is retrieved and provided to the network that initiated the query at step 206. At step 208, an OCI request is transmitted to OCI database 110 based upon the service profile associated with the recipient terminal. As indicated above, the OCI information may include graphics such as logos or icons, varying font and color elements, images, sound, video, and any multimedia information supported by the recipient and originator terminals and their networks. The OCI information requested from OCI database 110 is retrieved and sent to the recipient terminal at step 210. The call is forwarded to the recipient terminal at step 212. As shown in FIG. 3, the sample OCI information transmitted to the recipient terminal includes the originating party's name, company name, address, and web site address.

Figure 4:
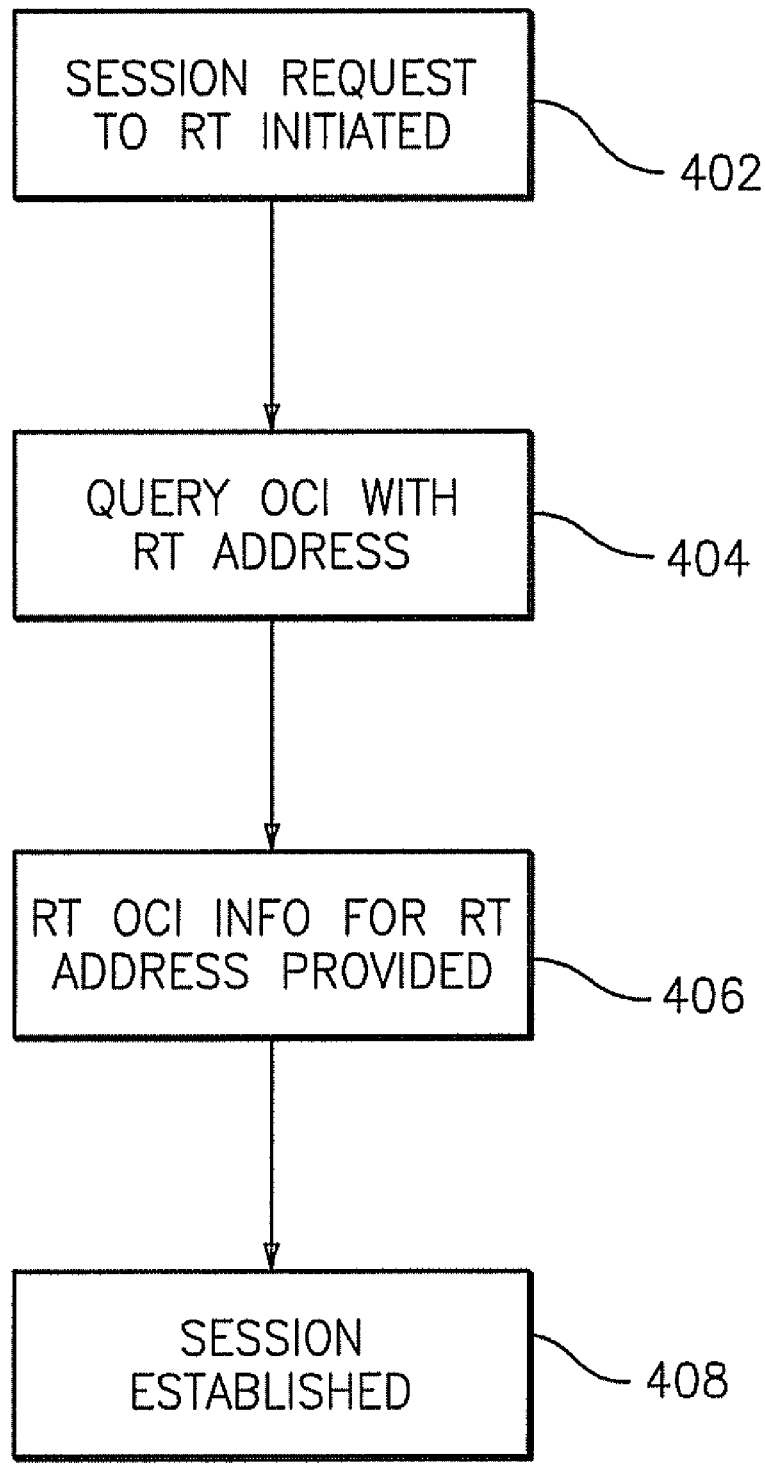
FIG. 4 is a flowchart describing the process of implementing the originator identification system over a packet-switched, peer-to-peer communications network in exemplary embodiments of the invention.
Figure 5:
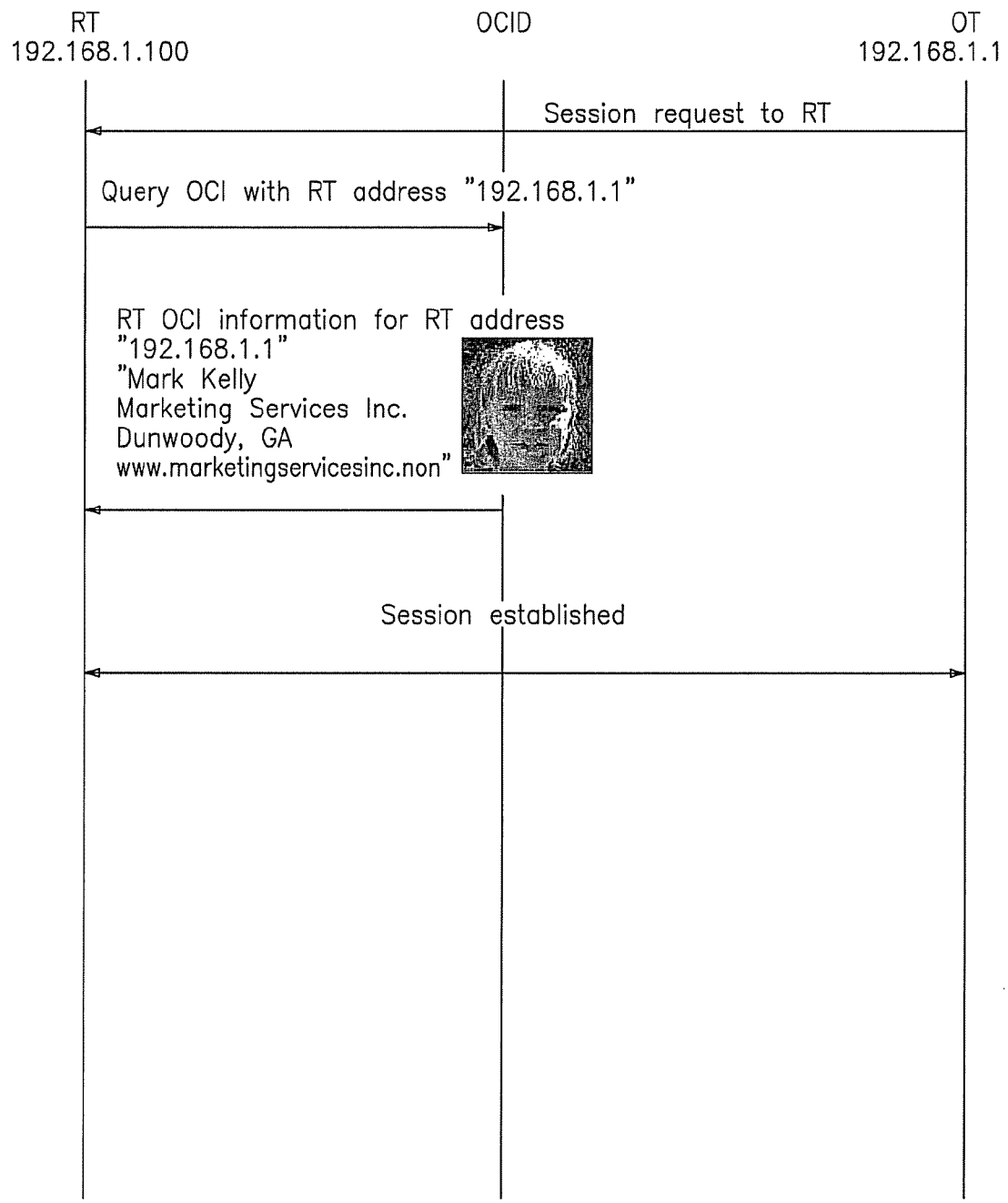
FIG. 5 is a graphical representation of the originator identification system process described in FIG. 4 in exemplary embodiments of the invention.

As indicated above, the originator identification system may be implemented over various types of communications networks. FIG. 4 describes the process of implementing the originator identification system over a peer-to-peer network. Additionally, a graphical representation of the process flow described in FIG. 4 is shown in FIG. 5. A session request is initiated by an originating terminal at step 402. The originating terminal address as shown in FIG. 5 is "192.168.1.1." The session request is transmitted to the recipient terminal using the address provided in the session request, and in the example data shown in FIG. 5 is "192.168.1.100." The recipient terminal accesses the originator identification system, which in turn, queries OCI database 110 for OCI information associated with the originating terminal at step 404. It will be understood that the service profile database 112 need not be accessed in this instance, as the originating and recipient terminals are both computer devices as evidenced by the routing addresses. In this manner, the communications transmissions are processed in accordance with traditional digital networking protocols. The OCI information is retrieved and forwarded to the recipient terminal at step 406. The sample OCI data that may be transmitted are reflected in FIG. 5 and include the originating party's name, company, address, web site address, and logo. The communication session is established at step 408 in which the recipient terminal user views the originator's information without opening the communication itself.

As indicated above, the originator identification system is a comprehensive communications service that provides a variety of information to communications recipients prior to opening or establishing a communications session with the sender of the communication. This allows recipients to better manage their communications by enabling them to make more informed decisions about the screening, routing, organizing, if or when to open or establish a communication.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for selecting enhanced originator information for transmission over a communications network, the method comprising:

retrieving a service profile for a recipient terminal from a service profile database in response to initiation of a communication by an originator terminal to the recipient terminal, the service profile specifying a service plan and a terminal capability of the recipient terminal to retrieve the enhanced originator information from the originator terminal;

retrieving multiple information elements associated with the originator terminal from a network database based upon the service plan and the terminal capability of the recipient terminal; and transmitting a communication including the multiple information elements to the recipient terminal prior to establishing a communications session with the recipient terminal;

wherein service plans are stored in a dual format that accommodates both graphically-enabled caller identification devices and caller identification devices that are not graphically enabled, and wherein transmitting the communication includes transmitting only the multiple information elements compatible with the terminal capability of the recipient terminal as specified according to the format in the service profile of the recipient terminal;

wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including preventing an incoming call, in which a caller has information elements that have been blocked by the recipient terminal pursuant to the service profile, from the recipient terminal.

2. The method of claim 1, wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including forwarding a call that includes a video file as the information elements to the recipient terminal.

3. The method of claim 1, further comprising processing the service profile to determine types of information elements that the recipient terminal receives to perform an enhanced originator identification of the originator terminal;

wherein the types of information elements include advertising material.

4. The method of claim 1, further comprising processing the service profile to determine types of information elements that the recipient terminal receives to perform an enhanced originator identification of the originator terminal;

wherein the types of information elements include at least one of:
a logo;
audio;
multi-media;
animation;
VPIM;
a uniform resource locator;
video; and
an alerting tone.

5. The method of claim 1, wherein the service profile is retrieved using a recipient terminal address in the communication initiation.

6. The method of claim 1, wherein the terminal capability relates to a terminal device type including at least one of:
a personal computer;
a network computer;
a wireless mobile telephone;
a wireless mobile computer device;
a facsimile;
a network appliance; and
a wireline telephone.

7. The method of claim 1, wherein the terminal capability relates to terminal device technology features including at least one of:
a binary-based caller identification feature; and
graphical features.

8. A non-transitory storage medium including machine-readable computer program code for transmitting enhanced originator information over a communications network, the storage medium including instructions for causing a server to implement a method comprising:

retrieving a service profile for a recipient terminal from a service profile database in response to initiation of a communication by an originator terminal to the recipient terminal, the service profile specifying a service plan and a terminal capability of the recipient terminal to retrieve the enhanced originator information from the originator terminal;

retrieving multiple information elements associated with the originator terminal from a network database based upon the service plan and the terminal capability of the recipient terminal; and transmitting a communication including the multiple information elements to the recipient terminal prior to establishing a communications session with the recipient terminal;

wherein service plans are stored in a dual format that accommodates both graphically-enabled caller identification devices and caller identification devices that are not graphically enabled, and wherein transmitting the communication includes transmitting only the multiple information elements compatible with the terminal capability of the recipient terminal as specified according to the format in the service profile of the recipient terminal wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including preventing an incoming call, in which a caller has information elements that have been blocked by the recipient terminal pursuant to the service profile, from the recipient terminal.

9. The storage medium of claim 8, wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including forwarding a call that includes a video file as the information elements to the recipient terminal.

10. The storage medium of claim 8, further comprising instructions for processing the service profile to determine types of information elements that the recipient terminal receives to perform an enhanced originator identification of the originator terminal;

wherein the types of information elements include at least one of:
a logo;
audio;
multi-media;
animation;

VPIM;
a uniform resource locator;
video; and
an alerting tone.

11. The storage medium of claim 8, wherein the terminal capability relates to a terminal device type including at least one of:
    a personal computer;
    a network computer;
    a wireless mobile telephone;
    a wireless mobile computer device;
    a facsimile;
    a network appliance; and
    a wireline telephone.

12. The storage medium of claim 8, wherein the terminal capability relates to terminal device technology features including at least one of:
    a binary-based caller identification feature; and
    graphical features.

13. A system for transmitting enhanced originator information over a communications network comprising:
    a caller identification-enabled recipient terminal, the recipient terminal operating over a communications network via a service provider;
    an originator terminal operating over a communications network via a service provider;
    a network-based originator communications information database;
    a service profile database for the originator terminal to retrieve a service profile of the recipient terminal to determine types of information elements representing enhanced originator information identifying the originator terminal, which the recipient terminal receives; and
    an originator identification system executed by the communications network, the originator identification system performing:
    retrieving a service profile for a recipient terminal from a service profile database in response to initiation of a communication by an originator terminal to the recipient terminal, the service profile specifying a service plan and a terminal capability of the recipient terminal to retrieve the enhanced originator information from the originator terminal;
    retrieving multiple information elements associated with the originator terminal from a network database based upon the service plan and the terminal capability of the recipient terminal; and
    transmitting a communication including the multiple information elements to the recipient terminal prior to establishing a communications session with the recipient terminal;
    wherein service plans are stored in a dual format that accommodates both graphically-enabled caller identification devices and caller identification devices that are not graphically enabled, and wherein transmitting the communication includes transmitting only the multiple information elements compatible with the terminal capability of the recipient terminal as specified according to the format in the service profile of the recipient terminal;
    wherein the service plan includes options including controlling presentation of the communication on the recipient terminal by screening the multiple information elements in the communication based upon at least one of content or format of the multiple information elements the screening performed based upon criteria configured by a user of the recipient terminal, the screening including preventing an incoming call, in which a caller has information elements that have been blocked by the recipient terminal pursuant to the service profile, from the recipient terminal.

14. The system of claim 13, wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including forwarding a call that includes a video file as the information elements to the recipient terminal.

15. The system of claim 13, wherein the originator identification system further performs:
    processing the service profile to determine types of information elements that the recipient terminal receives to perform an enhanced originator identification of the originator terminal;
    wherein the types of information elements include at least one of:
    a logo;
    audio;
    multi-media;
    animation;
    VPIM;
    a uniform resource locator;
    video; and
    an alerting tone.

16. The system of claim 13, wherein the terminal capability relates to a terminal device type including at least one of:
    a personal computer;
    a network computer;
    a wireless mobile telephone;
    a wireless mobile computer device;
    a facsimile;
    a network appliance; and
    a wireline telephone.

17. The system of claim 13, wherein the terminal capability relates to terminal device technology features including at least one of:
    a binary-based caller identification feature; and
    graphical features.

18. The system of claim 13, wherein the communication comprises at least one of:
    voice;
    data;
    video;
    messaging;
    instant messaging; and
    paging; and
    wherein the communications network includes at least one of:
    a circuit-switched network;
    a packet-switched network;
    a wireless network;
    an asynchronous transfer mode network; and
    a Multiprotocol Label Switching (MPLS) network.

* * * * *